United States Patent
Yoshikawa et al.

(10) Patent No.: US 6,480,787 B2
(45) Date of Patent: Nov. 12, 2002

(54) GPS RECEIVING SYSTEM

(75) Inventors: Shoji Yoshikawa, Tokyo (JP); Katsuhiko Yamada, Tokyo (JP); Jun Tsukui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/903,744

(22) Filed: Jul. 13, 2001

(65) Prior Publication Data

US 2002/0032525 A1 Mar. 14, 2002

(30) Foreign Application Priority Data

Sep. 12, 2000 (JP) ........................................ 2000-275882

(51) Int. Cl.$^7$ .............................................. G01C 21/00
(52) U.S. Cl. ........................ 701/213; 701/214; 701/215; 342/357.03; 342/357.12
(58) Field of Search ................................ 701/200, 213, 701/214, 215, 216; 342/357.06, 357.12, 357.03

(56) References Cited

U.S. PATENT DOCUMENTS

| 5,265,025 A | 11/1993 | Hirata |
| 5,638,077 A | * 6/1997 | Martin ................... 342/357.03 |
| 6,166,684 A | 12/2000 | Yoshikawa et al. |
| 6,205,400 B1 | * 3/2001 | Lin ............................ 701/214 |

FOREIGN PATENT DOCUMENTS

| JP | 308262 | 1/1994 |
| JP | 2743 | 1/1998 |

OTHER PUBLICATIONS

Nishimura et al.; "Guidance and Control in Aerospace", *Association of Instrumentation and Automatic Control,* pp. 273–275 (1995).

* cited by examiner

*Primary Examiner*—Yonel Beaulieu
(74) *Attorney, Agent, or Firm*—Leydig, Voit & Mayer, Ltd.

(57) ABSTRACT

A global positioning system (GPS) receiving system which achieves an equivalent synchronization in time measurement of GPS signals utilizing software without requiring highly accurate synchronization for receiver clocks with time information embedded in the GPS signals. The GPS receiving system performs a relative navigation process after correcting a pseudorange with a time tag error which is attributable to inaccuracy of receiver clocks of first and second moving objects. A relative navigation process correcting an absolute error of a time tag with a clock bias is also described. A differential computation unit calculates a difference between the first pseudorange and the second pseudorange commonized by the time tag commonizing unit. Correction in a time tag error correction unit is performed for the selected GPS data with a common GPS satellite identification number.

10 Claims, 14 Drawing Sheets

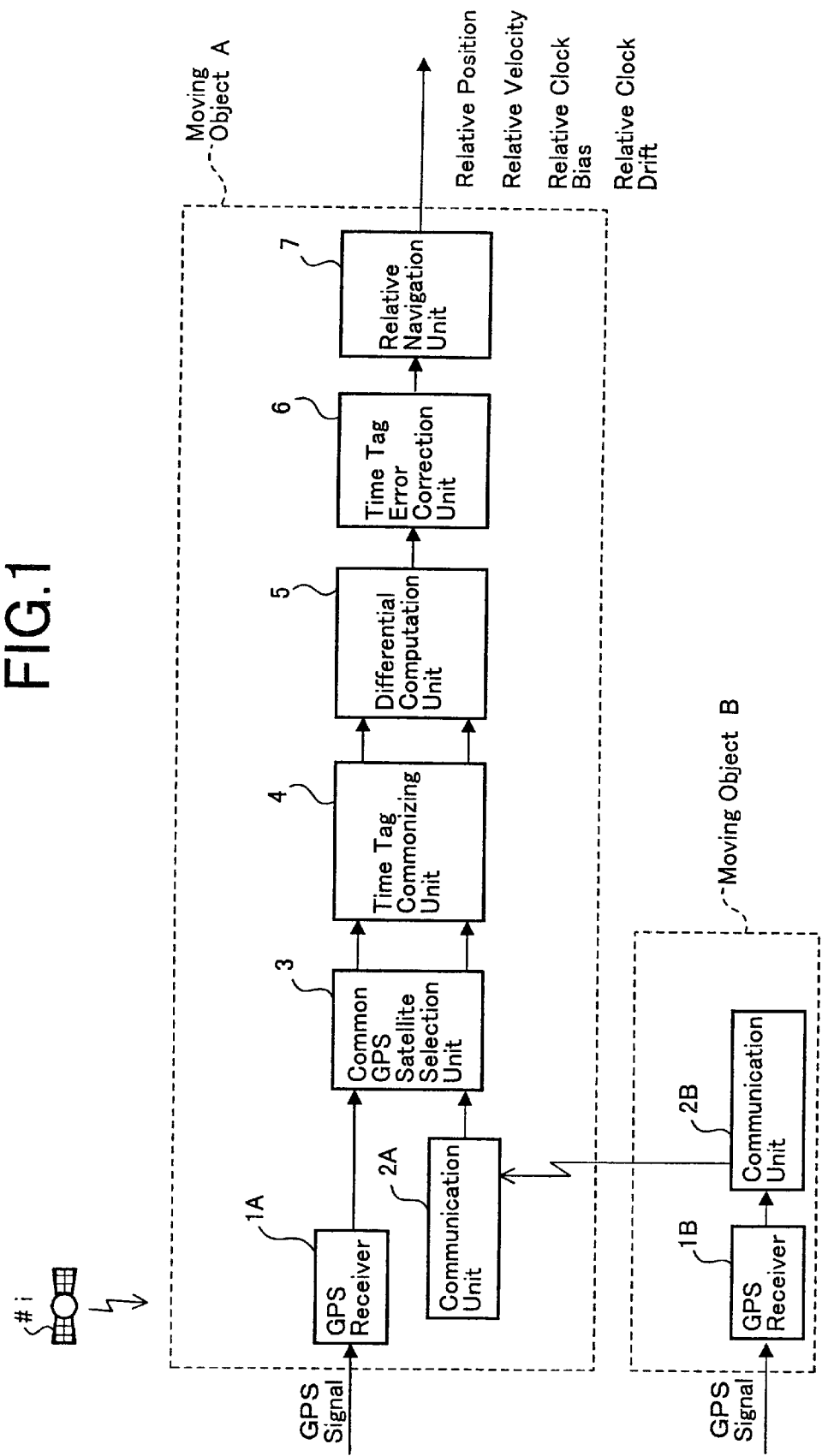

Interpolation on the basis of $t_n^B$

Extrapolation on the basis of $t_n^N$

Extrapolation with range rate on the basis of $t_n^N$

GPS RECEIVING SYSTEM

BACKGROUND OF THE INVENTION

1. Field of the Invention

The present invention relates to a GPS receiving system and, more particularly, to a GPS receiving system capable of determining relative positions and relative velocities of moving objects such as spacecraft, aircraft and vehicles with high accuracy.

2. Description of the Related Art

GPS (Global Positioning System) is known as a radio navigation system for obtaining the three-dimensional location by interpreting a positioning radio wave (GPS signal) transmitted from a plurality of artificial satellites (GPS satellites) that orbit the earth.

Presently twenty-seven GPS satellites (not counting spares) are orbiting and transmitting GPS signals. The GPS determines distances between a GPS receiver and at least four viewable GPS satellites in order to perform reliable positioning. A distance between a GPS receiver and a GPS satellite is obtained from the difference between a receiver clock and a satellite clock multiplied by the radio wave propagation velocity, and the distance thus obtained is referred to as a pseudorange.

Moving objects such as spacecraft, aircraft and vehicles carrying a GPS receiver obtain information concerning positions and velocities of themselves (GPS absolute navigation). On the other hand, the use of GPS between moving objects carrying their own GPS receivers makes it possible to determine the relative position and the relative velocity of a moving object with respect to another moving object (GPS relative navigation).

The GPS relative navigation improves positioning accuracy by offsetting errors common to both of the GPS receiver. For example, the relative positions and relative velocities are more accurately determined by receiving GPS signals transmitted simultaneously from a GPS satellite common to each of the GPS receivers. Therefore, efforts have been made to develop techniques for receiving GPS signals from a common GPS satellite and for receiving GPS signals at an equivalently identical time.

The number of GPS satellites to be traced with one GPS receiver has recently become greater than 12, which is sufficiently larger than the number (4) requisite for reliable positioning. Providing a sufficiently wide overlapping area in the view fields of GPS antennas between moving objects in relative navigation has made it easier to obtain the requisite number of GPS signals transmitted from common GPS satellites.

Commonizing the observed time on the basis of software or using hardware for obtaining an external synchronized signal are techniques known for receiving GPS signals at an equivalently identical time.

A description will now be made on a conventional GPS system with reference to the GPS receivers disclosed in Japanese Patent Laid-Open No. 2743/1998. In the block diagram of GPS receivers shown in FIG. 13, the preceding and following vehicles are two moving objects which are in relative navigation along a road in the same direction.

The preceding and following vehicles have, respectively, relative distance measuring devices S1 and S2, GPS antennas 11 and 21, GPS receiver units 12 and 22, controllers 13 and 23, communication units 14 and 24 for communication between the vehicles and ground antennas 15 and 25.

The controllers 13 and 23 include position calculation units 131 and 231 and follow up control units 132 and 232 for controlling the operation of the transmissions and brakes (not shown), etc.

The preceding and following vehicles take GPS signals into the GPS receiver units 12 and 22 through the GPS antennas 11 and 21, respectively. Since GPS signals are transmitted from each GPS satellite at a constant interval (period: T), time information embedded in the GPS signals is utilized as a synchronized signal.

Relative navigation between the preceding and following vehicles will now be described with reference to the communication timing chart shown in FIG. 14.

The preceding vehicle determines its present position $F_n$ based on a GPS signal $f_{GPS}$ (n) received at a time t=n. Then the GPS receiver unit 12 of the preceding vehicle determines its own velocity and moving direction from the present and previous positions, and the position calculation unit 131 in the controller 13 estimates a position $F^*_{n+1}$ of t=n+1 and transmits it to the following vehicle at a time $a_n$.

The position calculation unit 231 in the controller 23 of the following vehicle determines its present position $R_{n+1}$ based on a GPS signal $f_{GPS}$ (n+1) received at a time t=n+1, and compares it with the estimated position $F^*_{n+1}$ of the preceding vehicle taken into via the communication units 14 and 24 in advance to determine a relative position of t=n+1 of the two vehicles at a time $b_{n+1}$.

Performing this process periodically makes it possible to always measure the relative position of the following vehicle with respect to the preceding vehicle.

This method is based on an assumption that the GPS receivers are accurately synchronized with the time information embedded in the GPS signals and has an advantage of removing the need for an external synchronized signal. Inaccuracy in synchronization will lose the simultaneity and lead to a serious error in determination. Inaccuracy in synchronization occurs on a receiver clock under the influence of temperature etc.

As described above, synchronization of a receiver clock with the time information embedded in the GPS signals is very important for performing GPS relative navigation accurately. It should be, pointed out that synchronization utilizing an external synchronized signal requires separate hardware and makes a system costly. It should be also pointed out that equivalent synchronization utilizing conventional software requires receiver clocks to be in highly accurate synchronism (on the order of 10 $\mu$s, for example) with time information embedded in GPS signals.

SUMMARY OF THE INVENTION

The invention has its object to provide a GPS receiving system which achieves an equivalent synchronization in time measurement of GPS signals utilizing software to determine relative positions and relative velocities of moving objects with high accuracy.

According to the invention there is provided a GPS receiving system which performs a relative navigation process after correcting a pseudorange with a time tag error attributable to inaccuracy of receiver clocks of first and second moving objects in GPS relative navigation. The time tag error is preferably calculated from range rates and clock biases of the first and second moving objects. A differential computation unit calculates a difference between the first pseudorange and the second pseudorange commonized by a time tag commonizing unit. The correction in a time tag error correction unit is performed for the selected GPS data with a common GPS satellite identification number.

According to the invention there is also provided a GPS receiving system which performs a relative navigation process after correcting absolute error of a time tag with a clock bias in a time tag error correction unit. The correction in a time tag error correction unit is performed for the selected GPS data with a common GPS satellite identification number. A differential computation unit calculates a difference between the first pseudorange and the second pseudorange commonized by a time tag commonizing unit.

BRIEF DESCRIPTION OF THE DRAWINGS

FIG. 1 is a block diagram of a first preferred embodiment of the invention.

DESCRIPTION OF THE PREFERRED EMBODIMENTS

First Preferred Embodiment

Figure 2A:
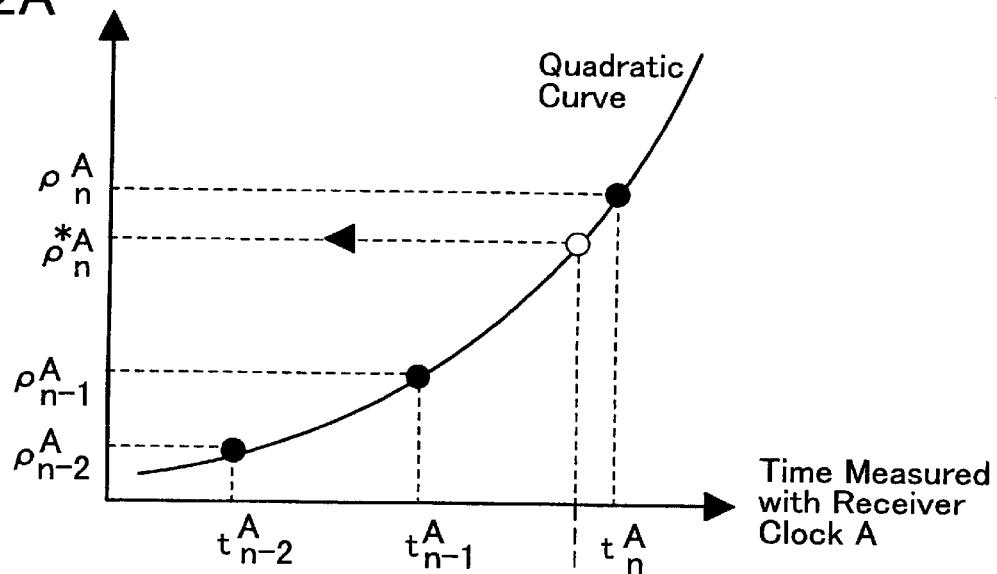
FIGS. 2A and 2B are first timing diagrams illustrating a process in a time tag commonizing unit.

A GPS receiving system according to a first preferred embodiment of the invention will now be described with reference to the block diagram shown in FIG. 1.

In FIG. 1, GPS receivers 1A and 1B interpret GPS signals transmitted from a GPS satellite; communication units 2A and 2B transmit and receive GPS data between a moving object A and a moving object B; a common GPS satellite selection unit 3 selects GPS data commonly observed by the moving objects A and B; a time tag commonizing unit 4 performs a process for commonizing the observed time in GPS data; a differential computation unit 5 calculates a difference between GPS data observed by the moving object A and GPS data observed by the moving object B; a time tag error correction unit 6 corrects errors in the time tag attributable to clock inaccuracy of the GPS receivers 1A and 1B; and a relative navigation unit 7 calculates relative position and relative velocity of the moving object A with respect to the moving object B.

The moving object A carries the GPS receiver 1A and communication unit 2A, and the moving object B carries the GPS receiver 1B and communication unit 2B. The GPS receivers 1A and 1B are in communication with one another via the communication units 2A and 2B. A GPS satellite #i in the figure represents GPS satellites having a common GPS satellite identification number among a plurality of GPS satellites observed by the moving objects A and B.

The moving objects A and B carry receiver clocks A and B (not shown) as a time reference respectively. A difference between a time measured with the receiver clock A/B and a true time (e.g., a time measured with a synchronized atomic GPS clock installed at a ground reference station) is referred to as "clock bias A/B".

The process will now be described. The GPS receivers 1A and 1B interpret GPS signals. An interpretation of the GPS signals yields GPS data such as ephemerides (information on the orbit of a GPS satellite), a GPS satellite identification number, a pseudorange, a range rate (a change rate of pseudorange) and a clock bias of the GPS satellite.

GPS data are tagged with a time tag to identify a time measured (or observed). The reading of the receiver clock at signal reception time is referred to as time tag hereafter. GPS data, range rate, etc. observed by the GPS receivers 1A/1B are distinguished by referring them as "GPS data A/B", "range rate A/B", etc.

The communication unit 2A acquires GPS data B over the communication unit 2B. The common GPS satellite selection unit 3 selects GPS data required for measuring the distance between the GPS receivers 1A and 1B and, specifically, compares GPS satellite identification numbers of the GPS data A with those of the GPS data B to select GPS data having a common satellite identification number.

The time tag commonizing unit 4 performs an appropriate interpolation or extrapolation on the time tag of the GPS data A and B to commonize the measured time, thereby to provide a commonized time tag. The interpolation and extrapolation process may employ linear interpolation or the least squares method.

An example of the time commonization performed by the time tag commonizing unit 4 will now be described with reference to FIGS. 2A/2B, 3A/3B and 4A/4B. FIGS. 2A, 3A and 4A show the relationships between a pseudorange $\rho^A$ observed by the moving object A and a time measured by the receiver clock A, and FIGS. 2B, 3B and 4B show the relationships between a pseudorange $\rho^B$ observed by the moving object B and a time measured by the receiver clock B.

Figure 2B:
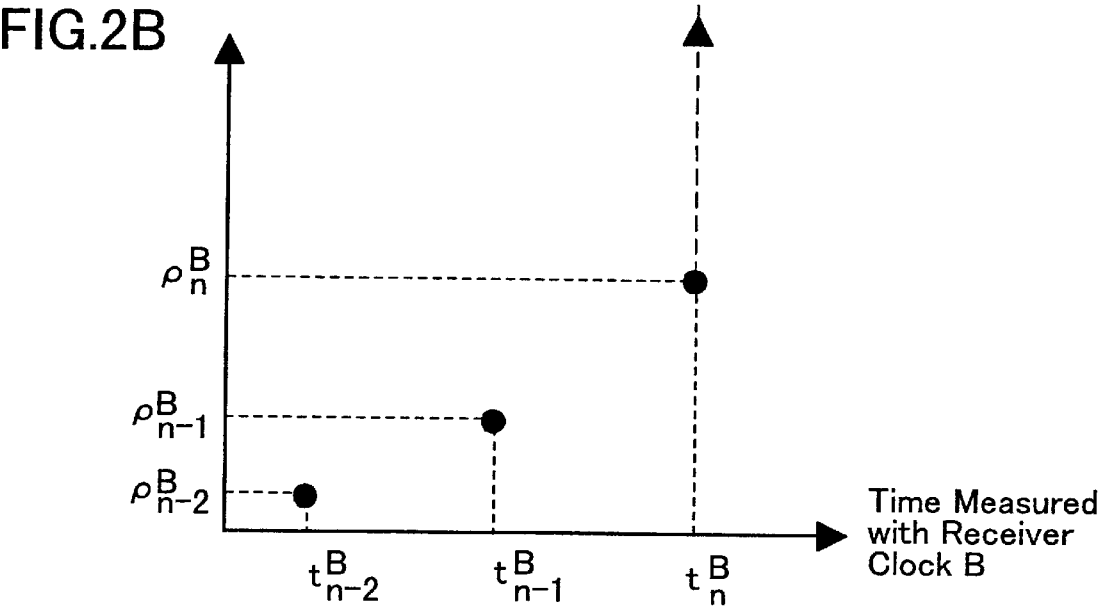
Figure 3A:
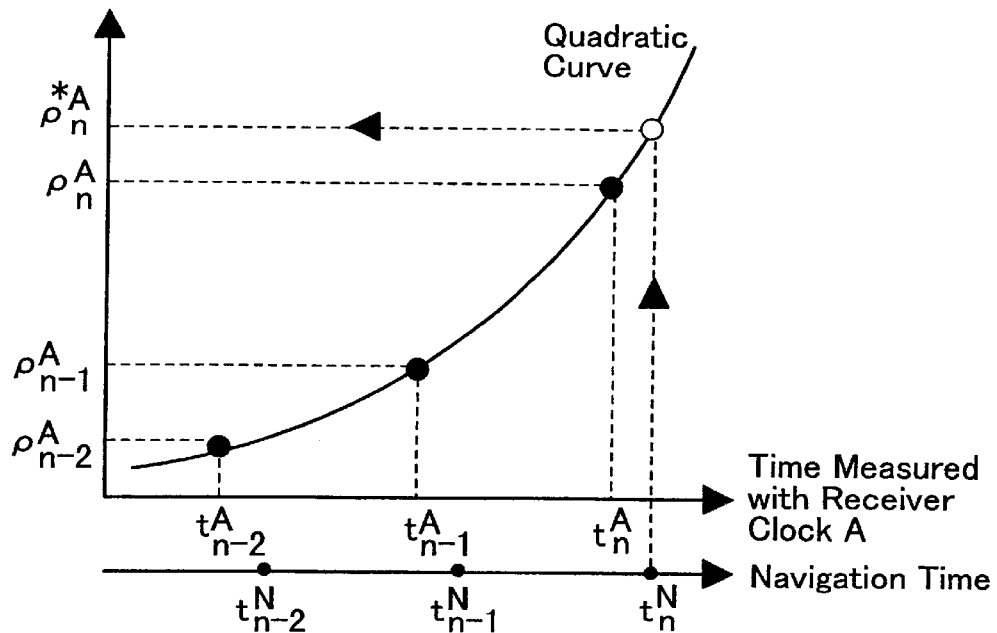
FIGS. 3A and 3B are second timing diagrams illustrating a process in the time tag commonizing unit.

FIGS. 2A and 2B show a method utilizing an n-th time $t^B_n$ of the moving object B. Pseudoranges $\rho^A_{n-2}$, $\rho^A_{n-1}$ and $\rho^A_n$ observed at times $t^A_{n-2}$, $t^A_{n-1}$ and $t^A_n$ are processed with quadric interpolation to estimate a pseudorange $\rho^{*A}_n$ at a time $t^B_n$.

Figure 3B:
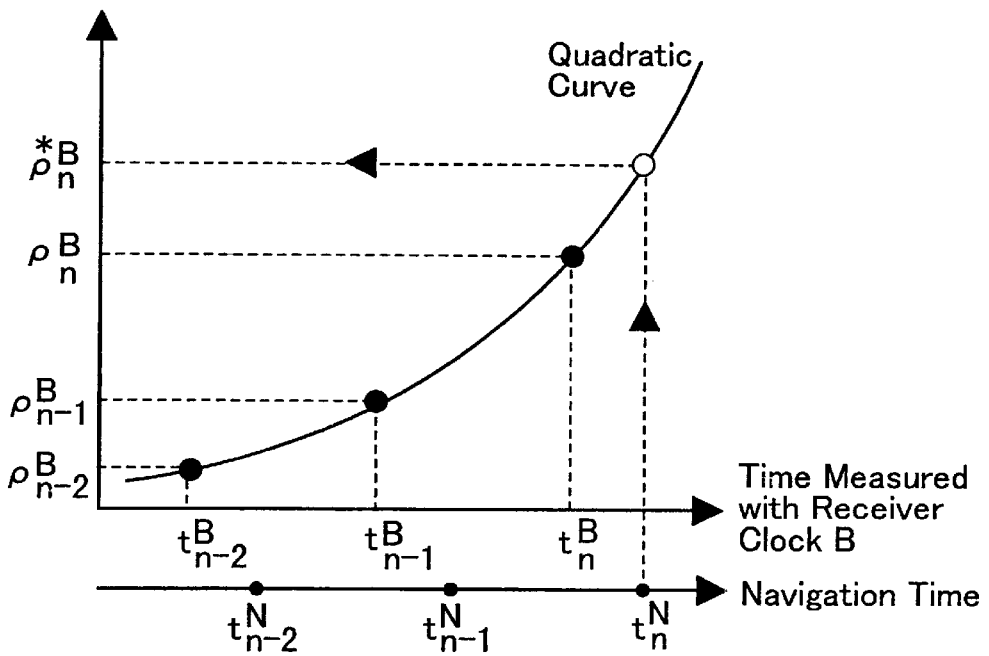
Figure 4A:
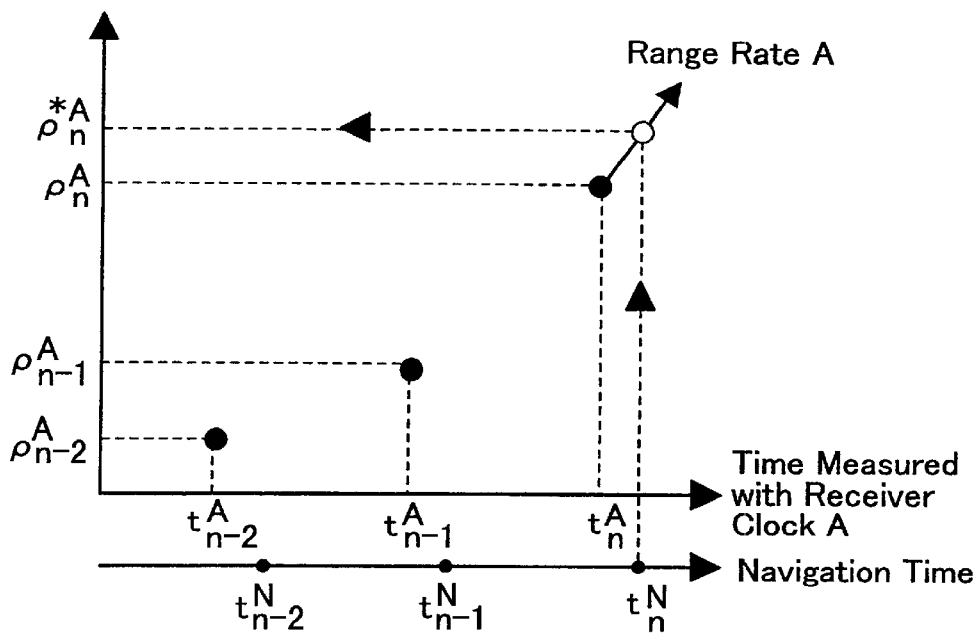
FIGS. 4A and 4B are third timing diagrams illustrating a process in the time tag commonizing unit.
Figure 4B:
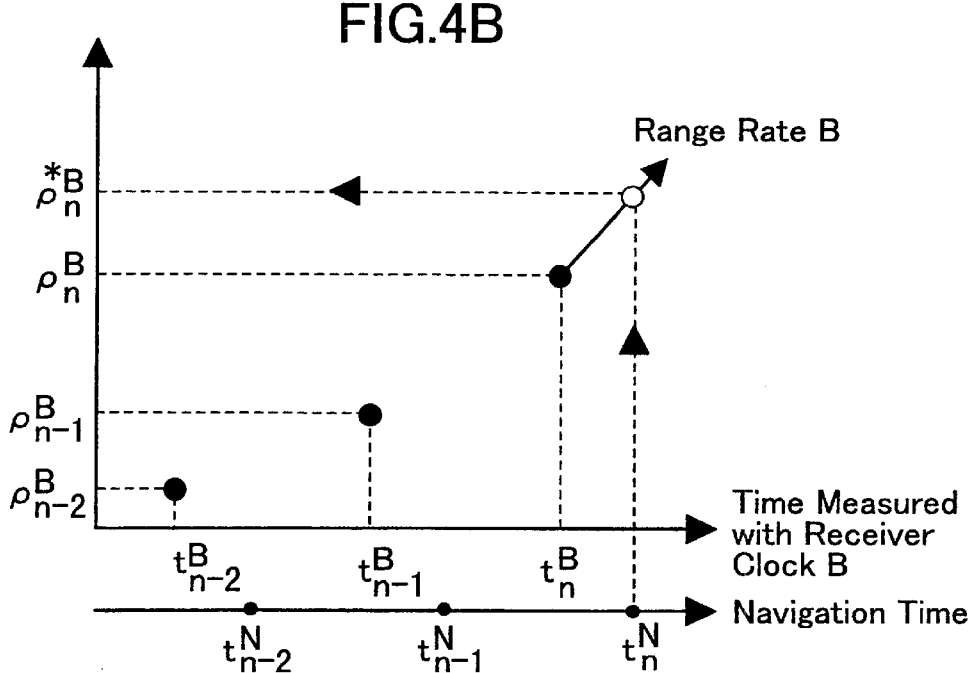

FIGS. 3A and 3B show a method utilizing a navigation time $t^N_n$ as a reference, where the navigation time is an integer time at which a GPS signal is scheduled to be observed. The receivers A/B measure the time normally at an interval of one second with the receiver clocks A/B.

The pseudoranges $\rho^A_{n-2}$, $\rho^A_{n-1}$ and $\rho^A_n$ observed at the times $t^A_{n-2}$, $t^A_{n-1}$ and $t^A_n$ are processed with quadric extrapolation to estimate a pseudorange $\rho^{*A}_n$ at the navigation time $t^N_n$. The pseudoranges $\rho^{*B}_{n-2}$, $\rho^B_{n-1}$ and $\rho B^A_n$ observed at times $t^B_{n-2}$, $t^B_{n-1}$ and $t^B_n$ are processed with quadric extrapolation to estimate a pseudorange $\rho^{*B}_n$ at the navigation time $t^N_n$.

FIGS. 4A and 4B show a method for performing an extrapolation based on range rate by using the navigation time $t^N_n$ as a reference. The pseudorange $\rho^{*A}_n$ at the navigation time $t^N_n$ is estimated from the pseudorange $\rho^A_n$ observed at the time $t^A_n$ and arrange rate $\hat{\rho}^A_n$ therefor. The pseudorange $\rho^{*B}_n$ at the navigation time $t^N_n$ is estimated from the pseudorange $\rho^B_n$ observed at the time $t^B_n$ and a range rate $\hat{\rho}^B_n$ therefor. For example, range rates A and B from the common GPS satellite selection unit 3 are used.

The differential computation unit 5 calculates a difference between the pseudoranges $\rho^{*A}_n$ and $\rho^{*B}_n$ which have been selected by the common GPS satellite selection unit 3 and commonized by the time tag commonizing unit 4.

Since receiver clocks have time inaccuracy with respect to the true time, the time tag error correction unit 6 corrects the difference (time tag error) of the commonized time tags which are provided by the time tag commonizing unit 4. Observation of a pseudorange $\rho^{Ai}$ at a time $t^R$ with the receiver clock A will give a definition of a time tag error in measurement. The symbol $\rho^{Ai}$ is a pseudorange between a GPS satellite #i and the GPS receiver 1A.

Let us assume that a clock bias of the receiver clock A is denoted by $b^A$ (which is positive when it leads the true time) to obtain a pseudorange measured at a true time $t^R-b^A$. Since the GPS receiver 1A is operative to drive the receiver clock A to be adjusted to a reference GPS clock, the clock bias is normally small. This gives Eq.(1).

$$\rho^{Ai}[t^R]=\rho^{Ai}[t^R-b^A]+(d\rho^{Ai}/dt^R)b^A+\text{(second or more derivatives with respect to } b^A) \quad (1)$$

In Eq.(1), $[t^R]$ and $[t^R-b^A]$ represent values observed at a true time $t^R$ and a true time $t^R-b^A$, respectively. Differential $d\rho^{Ai}/dt^R$ represents a range rate A ($=\hat{\rho}^A$), namely a rate of pseudorange over a time.

Eq. (1) represents that the pseudorange $\rho^{Ai}$ at the true time $t^R$ is substantially equal to the sum of the pseudorange observed at the time $t^R$ measured by the receiver clock A and the product of the range rate and clock bias thereof.

In the same manner, a pseudorange $\rho^B$ from the GPS satellite #i is observed at a time $t^R$ measured by the receiver clock B. Let us assume that $b^B$ represents a clock bias of the receiver clock B (which is positive when it leads the true time). This means that the pseudorange is observed at a true time $t^R-b^B$ to give Eq. (2).

$$\rho^{Bi}[t^R]=\rho^{Bi}[t^R-b^B]+(d\rho^{Bi}/dt^R)b^B+\text{(second or more derivatives with respect to } b^B) \quad (2)$$

Eq. (2) represents that the pseudorange $\rho^{Bi}$ at the true time $t^R$ is substantially equal to the sum of the pseudorange observed at the time $t^R$ measured by the receiver clock B and the product of the range rate B and clock bias B thereof.

It is apparent from Eqs. (1) and (2) that a difference $\Delta\rho^i[t^R]$ of the pseudoranges at the true time $t^R$ is given by Eq. (3).

$$\Delta\rho^i[t^R]=\rho^{Ai}[t^R]-\rho^{Bi}[t^R]$$

$$\approx\{\rho^{Ai}[t^R-b^A]-\rho^{Bi}[t^R-b^B]\}+\{(d\rho^{Ai}/dt^R)b^A-(d\rho^{Bi}/dt^R)b^B\} \quad (3)$$

Eq. (4) is given by the definition that the left side of Eq. (3) represents a corrected difference; the in-bracket term in the first half of the right side represents an observed difference; and the in-bracket term in the second half represents a time tag error.

$$\text{(corrected difference)}=\text{(observed difference)}+\text{(time tag error)} \quad (4)$$

Although it is preferable to use range rates A and B which have been commonized by the time tag commonizing unit 4 for calculating a time measurement error, range rates A and B which are yielded by the Common GPS satellite selection unit 3 is also used if priority of calculation is on accuracy to a lesser extent.

The relative navigation unit 7 calculates predictions of pseudoranges, positions, etc. by integrating an equation of relative motion of the moving object A with respect to the moving object B. At this time, it corrects the predictions of relative position and relative velocity of the moving object A with respect to the moving object B according to the corrected difference $\Delta\rho^i[t^R]$. The further function of the relative navigation unit 7 is described in, for example, "Guidance and Control in Aerospace", Nishimura et al., Association of Instrumentation and Automatic Control, pp.273–275(1995).

The GPS receiver according to the first preferred embodiment establishes equivalently synchronism in time measurement of a GPS signal even when the GPS receiver is not so accurately in synchronization with time information in the GPS signal because a time tag error is corrected by the time tag error correction unit 6. As a result, relative positions and velocities can be accurately determined.

The effect of the correction is especially significant in the case of a receiver clock having a considerable clock bias or in the case of a moving object having a great range rate such as a spacecraft. For example, suppose that a space station moving at 7 kilometers per second with respect to a GPS satellite has a clock bias of 1 millisecond. Then, it is possible to correct a time tag error which corresponds to 7 meters.

The positioning errors of GPS relative navigation are normally smaller than those of GPS absolute navigation because common errors are offset in a relative navigation. For example, while positioning errors range from 150 to 200 meters generally in GPS absolute navigation, positioning errors of GPS relative navigation are kept as small as about 20 meters. Then the correction of time tag errors is more effective in GPS relative navigation.

A description will now be made on an example of correction flow for predicted relative positions performed by the relative navigation unit 7 with reference to FIG. 5.

Figure 5:
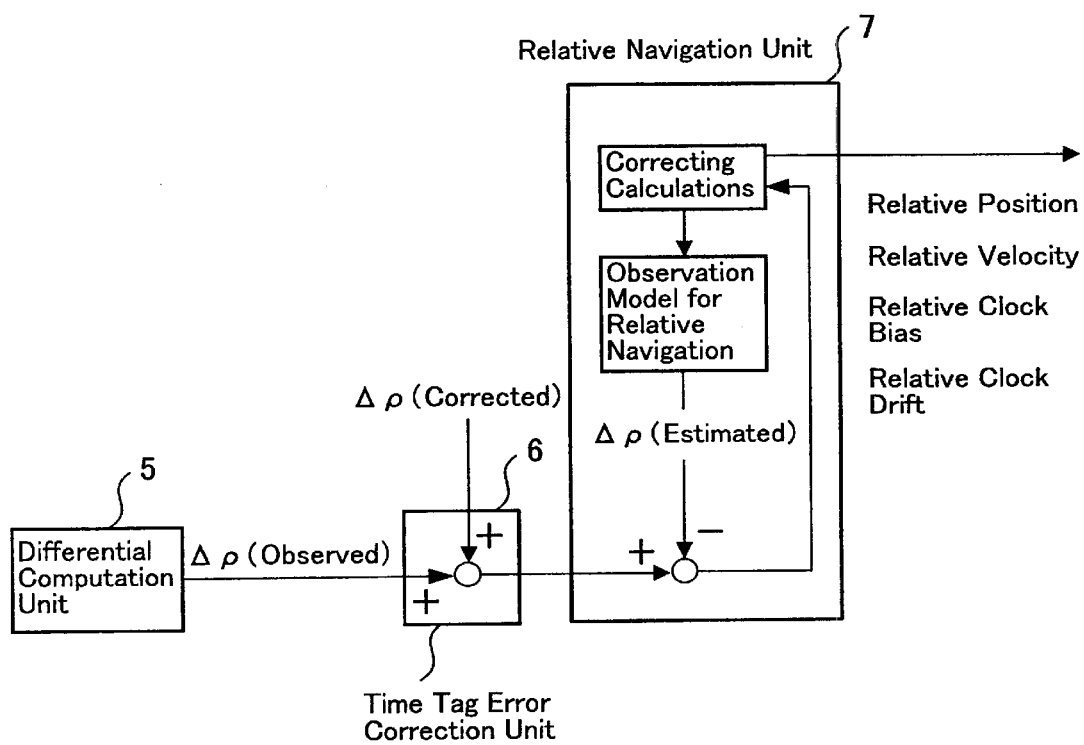
FIG. 5 is a flow diagram illustrating a process in a relative navigation unit.

In FIG. 5, $\Delta\rho$ (observed) represents an observed difference; $\Delta\rho$ (corrected) represents a time tag error; and $\Delta\rho$ (estimated) represents an estimated value of predicted relative positions. Eq. (5A) is given in a case where $\Delta\rho$ (predicted) represents an error for the estimated value. The relative navigation unit 7 carries out correcting calculations in a manner that $\Delta\rho$ (predicted) approaches zero.

$$\Delta\rho(\text{predicted})=\Delta\rho(\text{observed})+\Delta\rho(\text{corrected})-\Delta\rho(\text{estimated}) \quad (5A)$$

Figure 6:
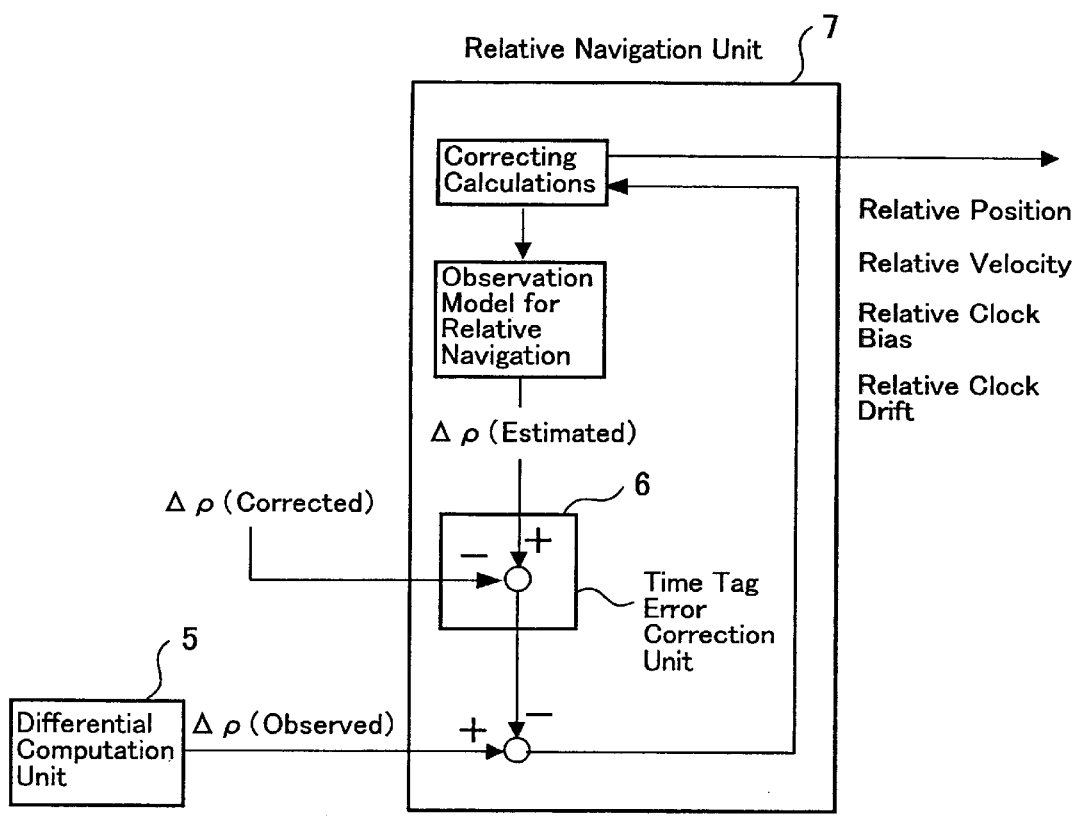
FIG. 6 is another flow diagram illustrating a process in the relative navigation unit.

FIG. 5 shows a method for adding a time tag error $\Delta\rho$ (corrected) to a difference $\Delta\rho$ (observed), the output of the differential computation unit 5. The time tag error $\Delta\rho$ (corrected) may alternatively be subtracted by the relative navigation unit 7 in calculating a predicted error $\Delta\rho$ (predicted). This is because that modification of Eq. (5A) gives Eq. (5B). FIG. 6 shows a process flow in this case. The relative navigation unit 7 includes the time tag error correction unit 6 inside itself.

$$\Delta\rho(\text{predicted})=\Delta\rho(\text{observed})-\{\Delta\rho(\text{estimated})-\Delta\rho(\text{corrected})\} \quad (5B)$$

The above description has referred to a case in which the moving object A acquires GPS data from the moving object B to calculate its relative position and velocity with respect to the moving object B. This is because the preferred embodiment refers to a mobile station (moving object A) moving around a base station (moving object B) such as a space station which can be regarded as being stationary or in an inertial motion.

Obviously, if the moving object B has the same equipment as that of the moving object A, the moving object B can acquire observed data of the moving object A to calculate its relative position and velocity with respect to the moving object A.

While the description has referred to a case in which the moving object A has the common GPS satellite selection unit 3, time tag commonizing unit 4, differential computation unit 5, time tag error correction unit 6 and relative navigation unit 7, the moving object B may provide a part of those units, e.g., the common GPS satellite selection unit 3.

In this case, the moving object B acquires data A first. Common GPS data selected by the moving object B are transmitted to the moving object A to correct a time tag error. This makes it possible to share the load of the computers between them. This is effective when the processing capability of the computer in the moving object B is higher than that of the computer in the moving object A.

Further, the number of moving objects with which the moving object B conducts relative navigation is not limited to one. The moving object B performs GPS relative navigation with a plurality of moving objects having the same equipment as that of the moving object A within the allowable processing capability of the computers.

Second Preferred Embodiment

The first preferred embodiment describes a method for calculating a time tag error by using GPS data yielded by GPS receivers 1A and 1B for use of general purpose. There are cases where range rates and clock biases yielded by the general purpose GPS receivers have insufficient accuracy or a higher speed in processing is desired to acquire data more quickly even if accuracy of the data is reduced. Providing an absolute navigation unit makes it possible to deal with such cases, as will be described below.

Figure 7:
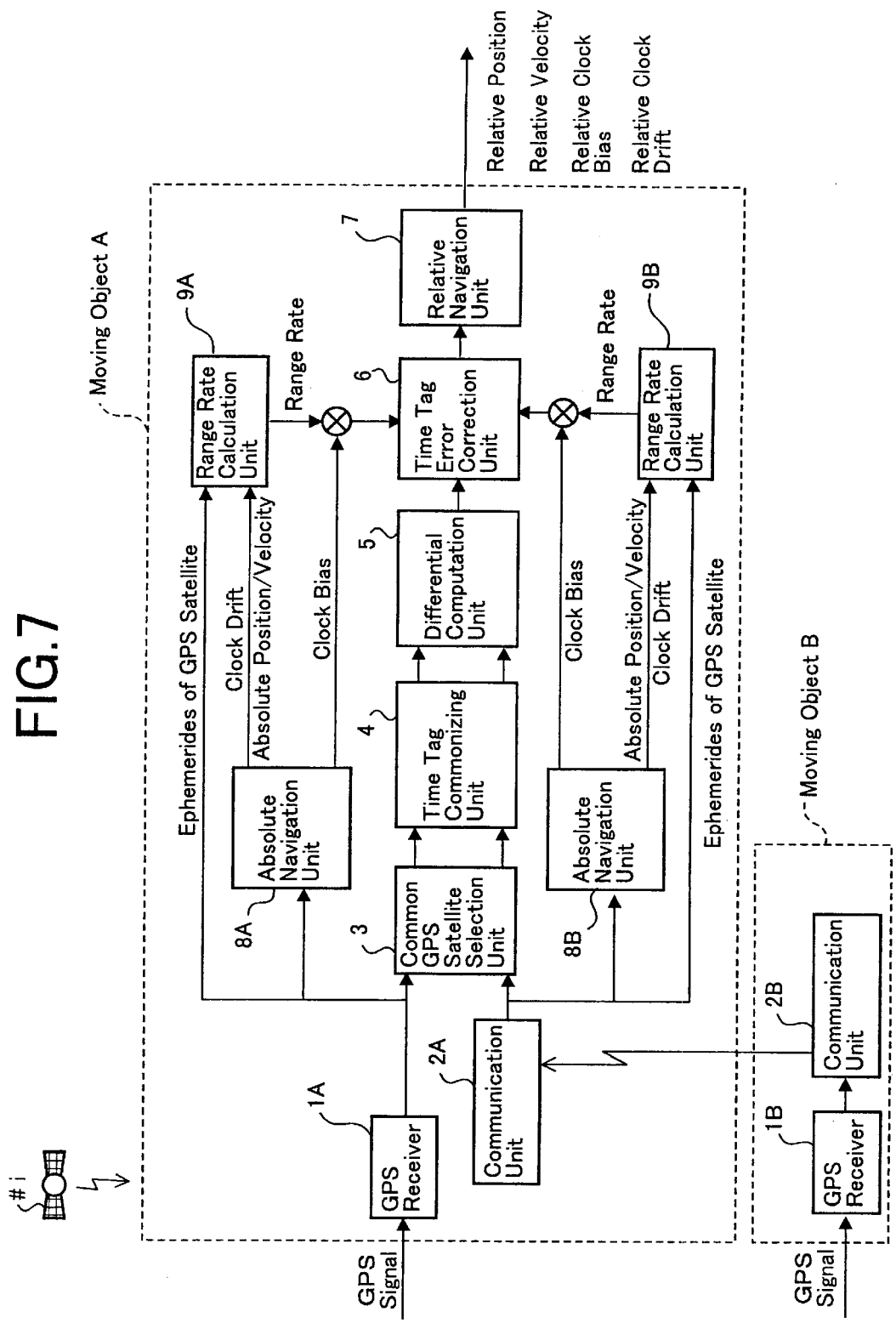
FIG. 7 is a block diagram of a second preferred embodiment of the invention.

FIG. 7 is a block diagram showing a GPS receiving system according to a second preferred embodiment of the invention, whereby parts indicated by the same reference numerals as those in FIG. 1 are identical or similar parts and will not be described here.

In FIG. 7, absolute navigation units 8A and 8B are mounted on a moving object A, and range rate calculation units 9A and 9B mounted on the moving object A calculate a range rate based on an observation model for relative navigation.

The absolute navigation unit 8A processes GPS data yielded by a GPS receiver 1A to estimate the absolute position, absolute velocity, clock bias and clock drift (change rate of the clock bias over time) of the moving object A.

The range rate calculation unit 9A calculates the range rate of the moving object A, based on the observation model for relative navigation expressed by Eq. (6A), from the output of the absolute navigation process unit 8A and ephemerides of a GPS satellite. The superscript "$T$" in Eq. (6A) stands for transposition of a vector, and $t^s$ denotes a transmission time of a GPS signal. The clock bias and clock drift of the GPS satellite are calculated from the ephemerides.

$$(d\rho^{Ai}/dt^R)=(u^{Ai})^T(p^G[t^s]-p^A[t^R])+c(\hat{b}^A[t^R]-\hat{b}^G[t^s]) \quad (6A)$$

where $$u^{Ai}=\{p^G[t^s]-p^A[t^R]\}/|p^G-p^A| \quad (7A)$$

In FIG. 6, $p^G$ and $p^A$ represent the absolute velocity of a GPS satellite #i and the absolute velocity of the moving object A respectively, and $\hat{b}^A$ and $\hat{b}^G$ represent the clock drift of a receiver clock A and the clock drift of the GPS satellite #i respectively. In addition, $u^{Ai}$ represents the vector of the GPS #i in the direction of the line of sight viewed from the moving object A, and $p^G$ represents the absolute position of the GPS satellite #i.

Similarly, the absolute navigation process unit 9A processes GPS data acquired through communication units 2A and 2B to estimate the absolute position, absolute velocity, clock bias and clock drift of the moving object B. The range rate calculation unit 9B calculates the range rate of the moving object B based on the observation model for relative navigation expressed by Eq. (6B) from the output of the absolute navigation unit 8B and ephemerides of the GPS satellite.

$$(d\rho^{Bi}/dt^R)=(u^{Bi})^T(p^G[t^s]-p^B[t^R])+c(\hat{b}^B[t^R]-\hat{b}^G[t^s]) \quad (6B)$$

where $$u^{Bi}=\{p^G[t^s]-p^B[t^R]\}/|p^G-p^B| \quad (7B)$$

Corrected differences are calculated according to Eq. (3) using range rates A and B that are the output of the range rate calculation units 9A and 9B and clock biases A and B that are the output of the absolute navigation units 8A and 8B.

Since calculations for correction are carried out using the Observation model for relative navigation according to the second preferred embodiment, it is possible to customize the absolute navigation units 8A and 8B and the range rate calculation units 9A and 9B, unlike the case where a general purpose GPS receiver is used. Then, though the load of the computer is increased, the speed or the accuracy of calculating the range rates and clock biases can be adjusted to a required level.

Further, some general purpose GPS receivers yield only a part of the interpreted GPS data. According to the second preferred embodiment, the present invention can be applied to a GPS receiver which does not yield a range rate or clock bias.

Third Preferred Embodiment

Figure 8:
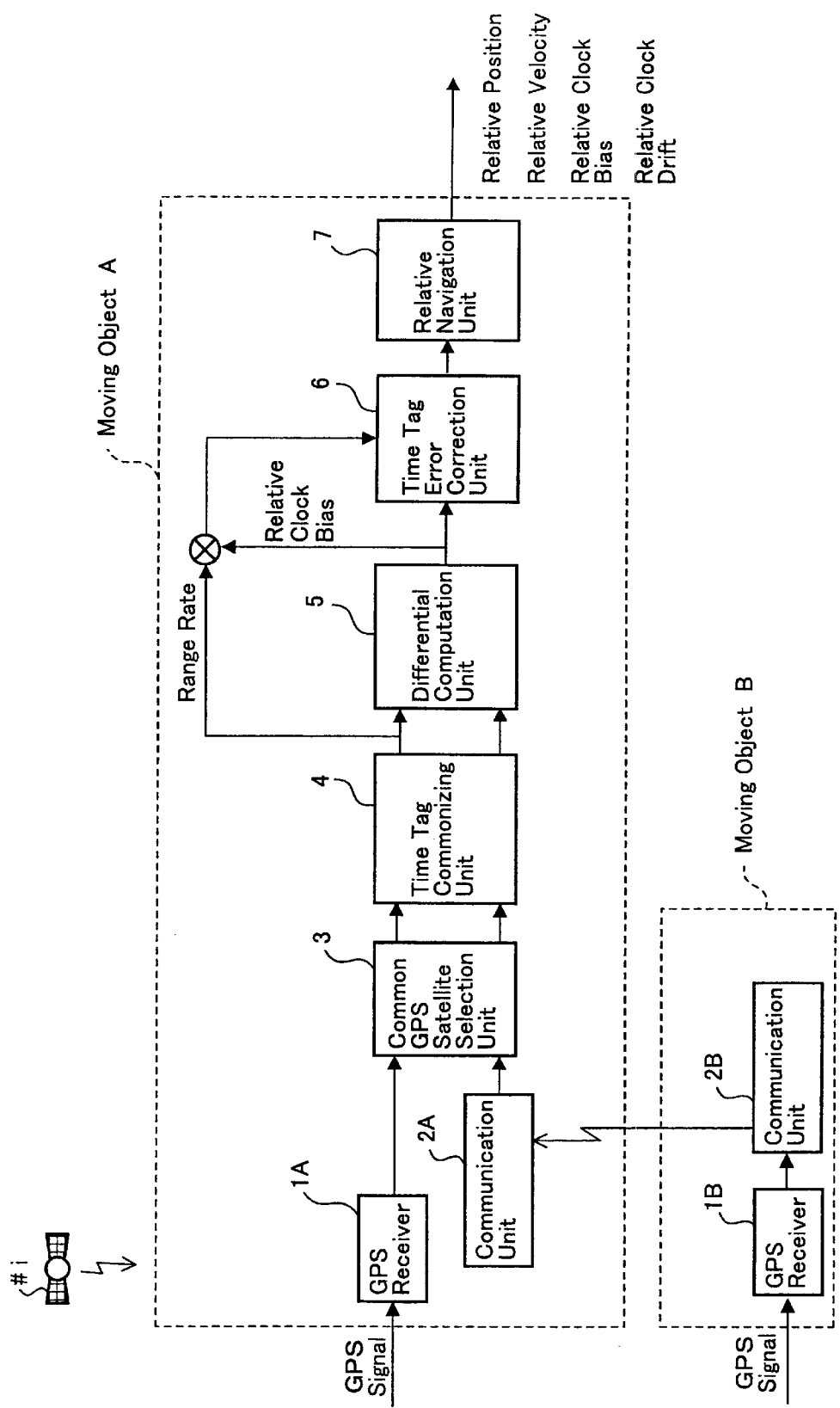
FIG. 8 is a block diagram a third preferred embodiment of the invention.

FIG. 8 shows a GPS receiving system according to a third preferred embodiment of the invention. According to the third preferred embodiment, a time tag error is calculated based on Eq. (3). Like reference numerals are used in the block diagram shown in FIG. 8 to designate elements identical with or corresponding to those of FIG. 1.

A time tag error correction unit 6 according to the third preferred embodiment calculates a corrected difference based on Eq. (8) and provides output to a relative navigation unit 7. According to Eq. (8), a time tag error is calculated as the product of a range rate $\hat{b}^A$ (output of the time tag commonizing unit 4) and a relative clock bias (output of a differential computation unit 5). The relative clock bias is given by a difference between times measured by receiver clocks A and B and is equal to a difference between clock biases $b^A$ and $b^B$.

(corrected difference)=(observed difference)+(range rate)×(relative clock bias) (8)

This operation is based on the fact that Eqs. (9A) and (9B) are approximately given by Eq. (3) provided that the range rates $\hat{\rho}^A$ and $\hat{\rho}^B$ are regarded equal to each other.

$\Delta \rho^i[t^R]$ $\approx \Delta \rho^i[A-B] + (d\rho^{Ai}/dt^R)(b^A - b^B)$ (9A)

$\approx \Delta \rho^i[A-B] + (d\rho^{Bi}/dt^R)(b^A - b^B)$ (9B)

where $\Delta \rho^i[A-B]$ denotes an observed difference expressed by Eq. (10).

$\Delta \rho^i[A-B] = \rho^{Ai}[t^R - b^A] - \rho^{Bi}[t^R - b^B]$ (10)

Figure 9:
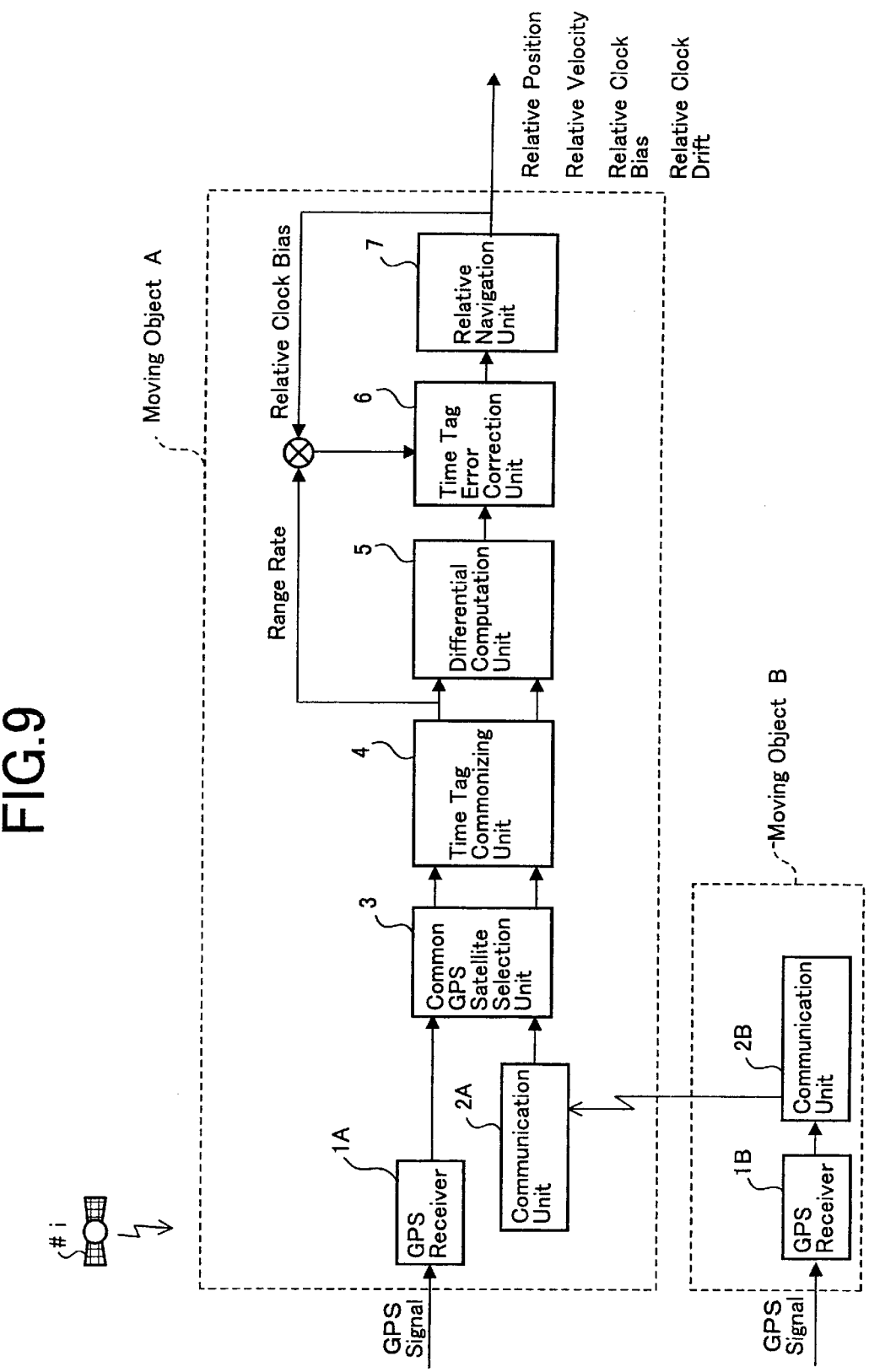
FIG. 9 is another block diagram of the third preferred embodiment of the invention.

A relative clock bias from the relative navigation unit 7, not from the differential computation unit 5 is used in FIG. 9. The relative navigation unit 7 is located downstream of the time tag error correction unit 6 and has an advantage of processing signals with reduced random noises. However, an initial value must be defined thereof.

A range rate from the common GPS satellite selection unit 3 may be used. However, a range rate from the time tag commonizing unit 4 is preferable for use, because it has higher accuracy as a result of a time tag commonizing process performed thereon.

The third preferred embodiment has an advantage of less load on the computer for a correction calculation because it requires a smaller number of range rates for determining a time tag error than the first and second preferred embodiments.

The range rate B, as well as range rate A, also may be used for a correction calculation.

Fourth Preferred Embodiment

Figure 10:
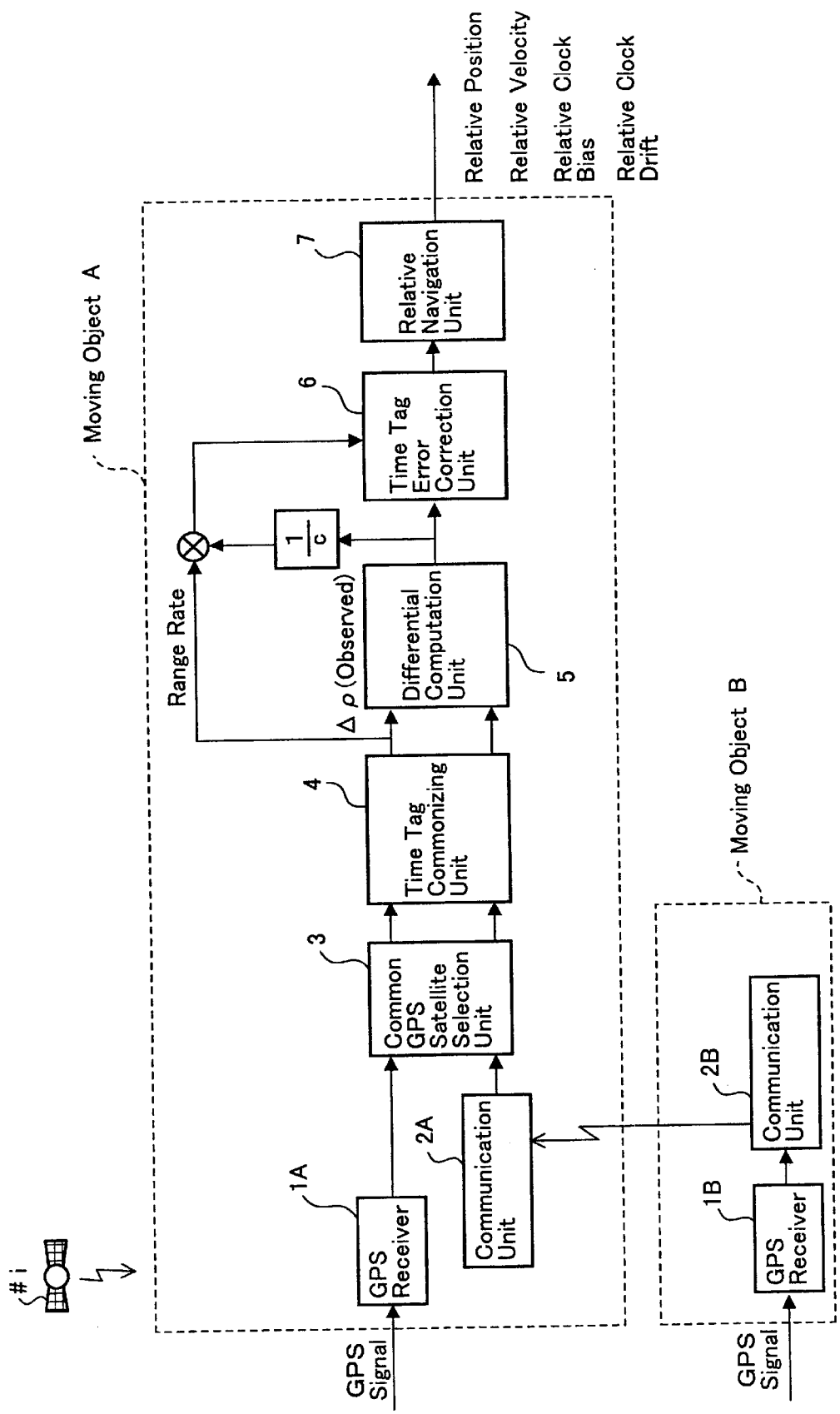
FIG. 10 is a block diagram of a fourth preferred embodiment of the invention.

FIG. 10 shows a GPS receiving system according to a fourth preferred embodiment of the invention. Like reference numerals are used in FIG. 10 to designate elements identical with or corresponding to those of FIG. 1.

A time tag error correction unit 6 according to the fourth preferred embodiment obtains a time tag error by calculating the product of $\hat{\rho}^A$ or $\hat{\rho}^B$ (output of the time tag commonizing unit 4) and $\Delta \rho$ (observed; output of a differential computation unit 5) divided by c (the velocity of light). That is, Eq. (11) is satisfied.

(corrected difference)=(observed difference)+(range rate)×(observed difference)/c (11)

This operation is based on the fact that Eqs. (12A) or (12B) are given approximately by Eqs. (9A) or (9B) where a relative clock bias is regarded equal to an observed difference divided by the velocity of light.

$\Delta \rho^i[t^R]$ $\approx \Delta \rho^i[A-B] + (d\rho^{Ai}/dt^R) \times \Delta \rho^i[A-B]/c$ (12A)

$\approx \Delta \rho^i[A-B] + (d\rho^{Bi}/dt^R) \times \Delta \rho^i[A-B]/c$ (12B)

In the fourth preferred embodiment, as described above, range rate uses the output of the time tag commonizing unit 4 as it is. In addition, observed difference (the output of the differential computation unit 5) divided by the velocity of light is used to obtain a relative clock bias approximately. This makes it possible to calculate a corrected difference with further reduced load on the computer. The preferred embodiment has an advantage of calculating a correction even when the system is in a start-up state to fail to have values necessary for the relative navigation such as a relative clock bias.

Fifth Preferred Embodiment

The first through fourth preferred embodiments have described methods for correcting an observed difference based on Eq. (3). Fifth and sixth preferred embodiments correct inaccuracy of GPS receiver clocks based on a different method, that is, time tag itself is corrected based on Eqs. (13A) and (13B).

Figure 11:
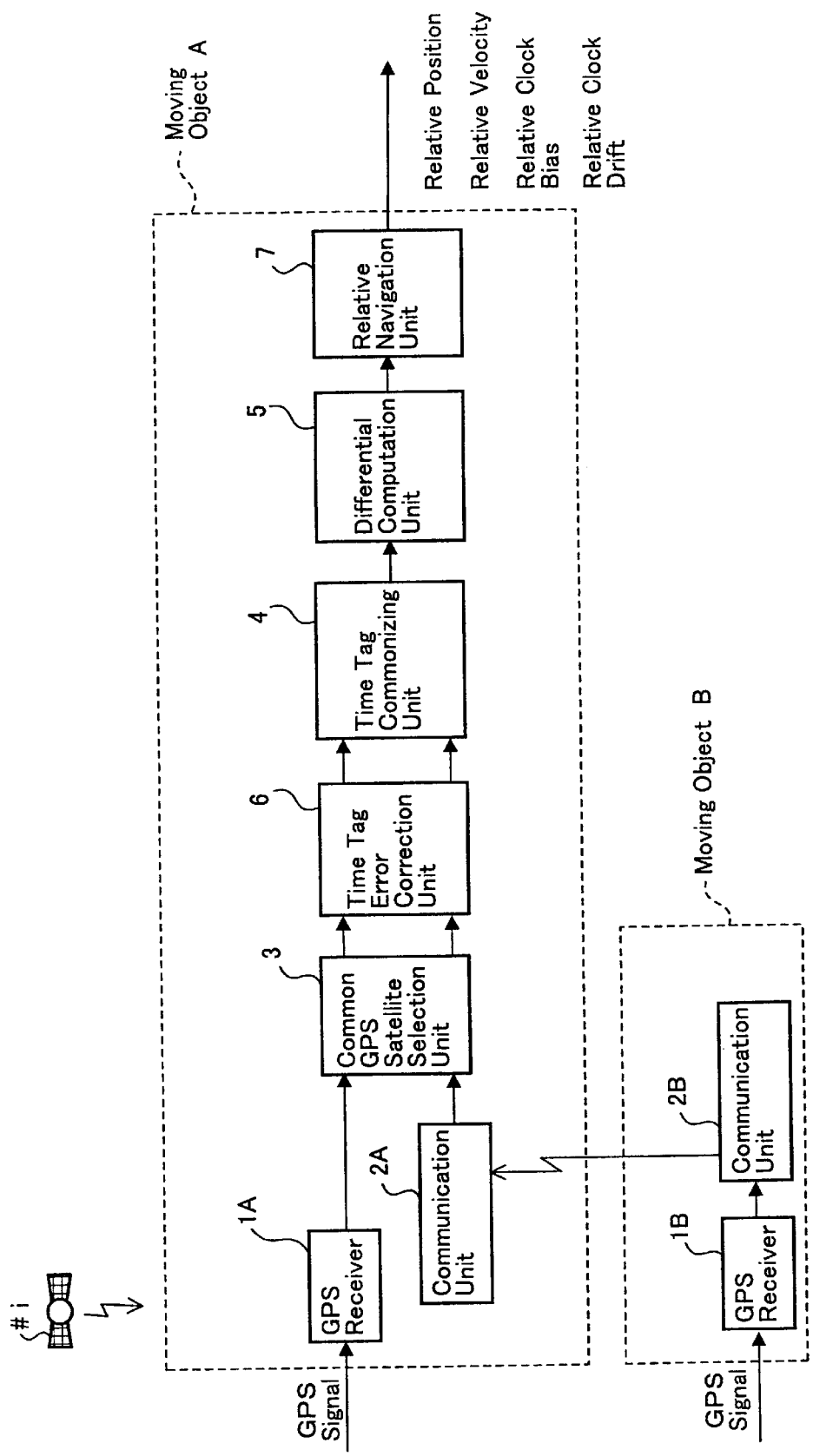
FIG. 11 is a block diagram of a fifth preferred embodiment of the invention.

FIG. 11 is a block diagram showing a GPS receiving system according to the fifth preferred embodiment of the invention. A time tag error correction unit 6 is characterized by its location upstream a time tag commonizing unit 4. Like reference numerals are used in FIG. 11 to designate elements identical with or corresponding to those of FIG. 1.

A GPS receiver 1A interprets GPS signals received through a GPS antenna (not shown) mounted on a moving object A and yields GPS data A. A communication unit 2A acquires GPS data B yielded by a GPS receiver 1B mounted on a moving object B through a communication unit 2B.

A common GPS satellite selection unit 3 compares GPS satellite identification numbers of the GPS data A with those of the GPS data B to select a GPS satellite with a common identification number.

A time tag error correction unit 6 corrects a time tag of the GPS data yielded by the GPS receiver 1A based on the following equation using a clock bias (output of the GPS receiver 1A).

(corrected time tag)=(time tag)−$b^A$ (13A)

It also corrects a time tag of the GPS data yielded by the GPS receiver 1B based on the following equation using a clock bias (the output of the GPS receiver 1B).

(corrected time tag)=(time tag)−$b^B$ (13B)

The time tag commonizing unit 4 commonizes the corrected time tag of the GPS data A and the corrected time tag of the GPS data B using an appropriate interpolation or extrapolation process as described in the first preferred embodiment.

A differential computation unit 5 calculates differences between the GPS data A and GPS data B processed by the time tag commonizing unit 4.

A relative navigation unit 7 calculates predictions of pseudoranges, positions, etc. by integrating an equation of relative motion of the moving object A with respect to the moving object B. At this time, it corrects the predictions of relative position and relative velocity of the moving object A with respect to the moving object B according to the corrected difference $\Delta \rho^i[t^R]$.

According to the fifth preferred embodiment, absolute errors of time tag are corrected in the time tag commonizing unit 4 using the clock biases $b^A$ and $b^B$ in advance. This makes it possible to equivalently establish synchronism in time measurement of a GPS signal even when the GPS receiver is not so accurately in synchronization with time information in the GPS signal. As a result, relative positions and relative velocities can be accurately determined and, further, this simple method for correction reduces the load of the computer.

Sixth Preferred Embodiment

Some general purpose GPS receivers yield only a part of interpreted GPS data. When GPS receivers 1A and 1B do not yield a clock bias, absolute navigation process units 8A and 8B described in the second preferred embodiment may be provided on the moving object A to deal with this situation.

Figure 12:
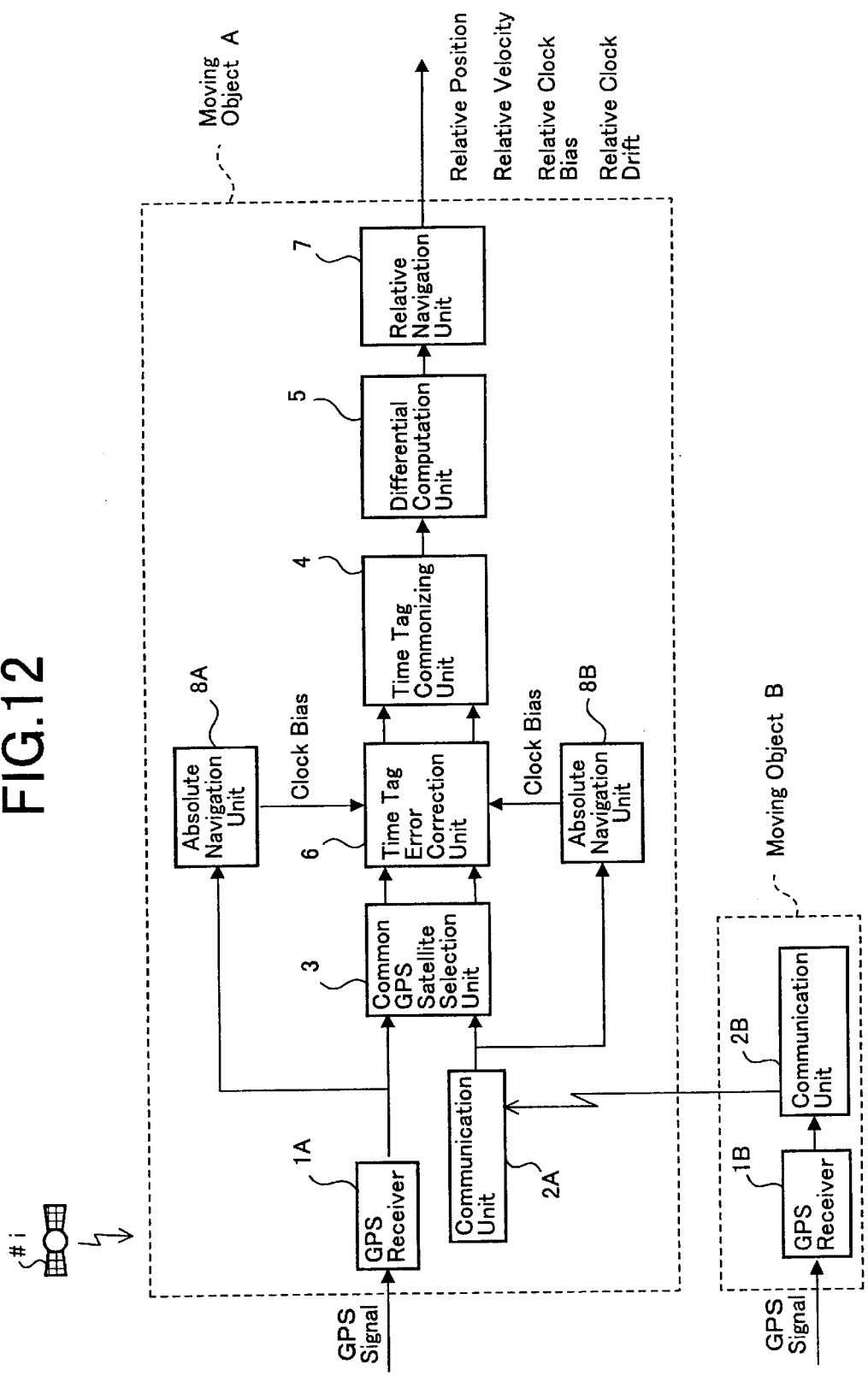
FIG. 12 is a block diagram of a sixth preferred embodiment of the invention.
Figure 13:
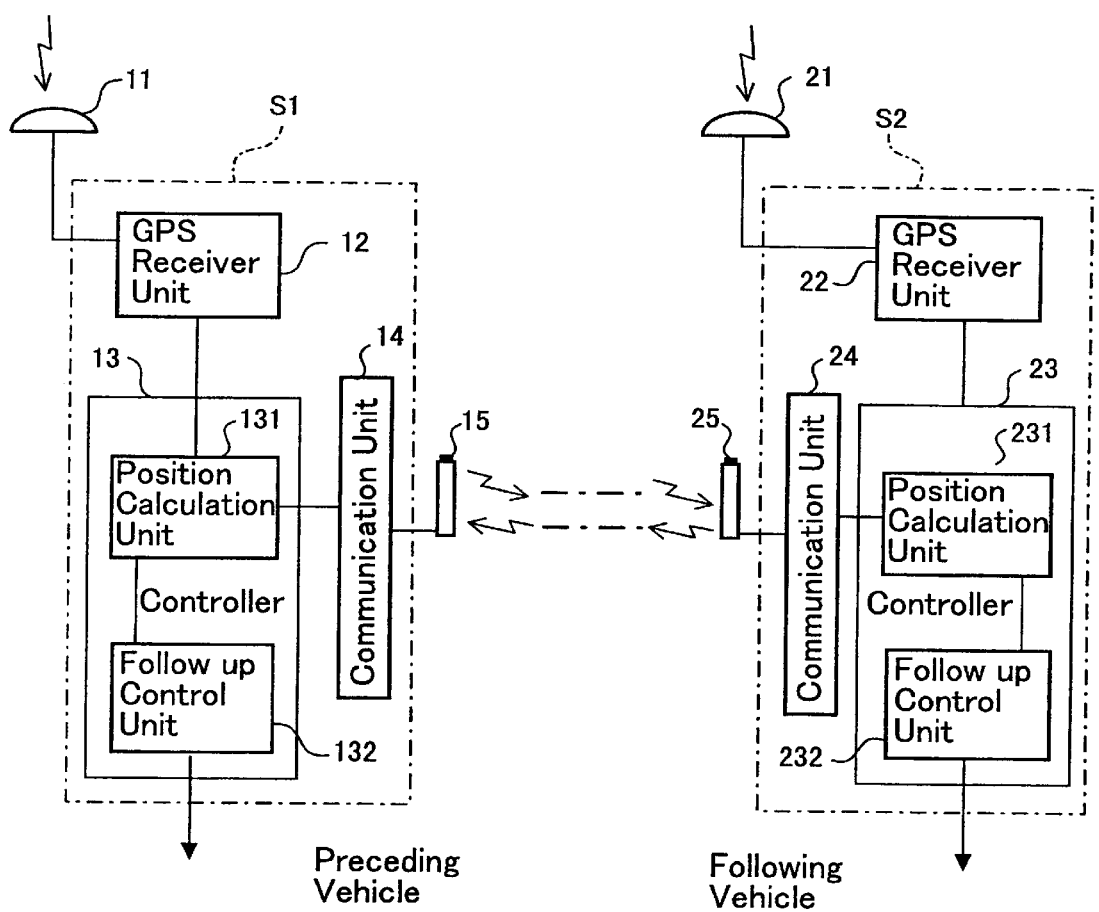
FIG. 13 is a block diagram of a conventional GPS system for relative navigation.
Figure 14:
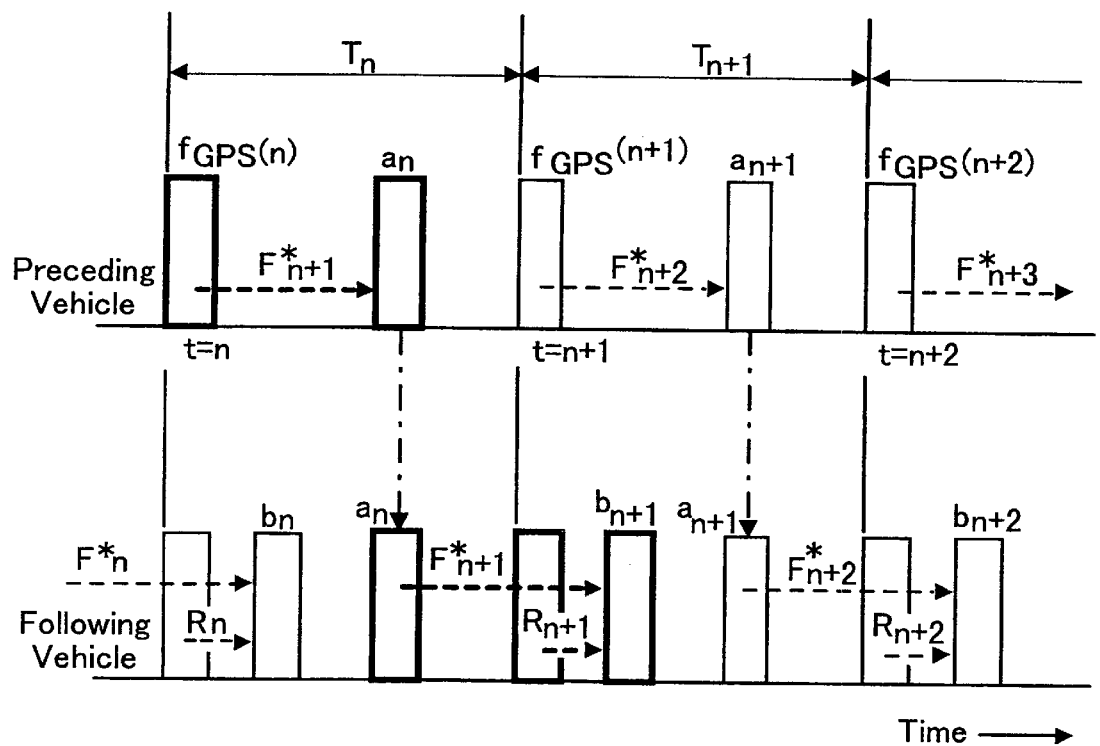
FIG. 14 is a timing chart for explaining the conventional GPS system in relative navigation.

FIG. 12 is a block diagram showing a GPS receiving system according to a sixth preferred embodiment of the invention. Like the fifth preferred embodiment, a time tag error correction unit 6 is located upstream of a time tag commonizing unit 4. Like reference numerals are used in FIG. 12 to designate elements identical with or corresponding to those of FIG. 11.

An absolute navigation unit 8A processes GPS data yielded by a GPS receiver 1A to determine the absolute position, absolute velocity, clock bias and clock drift of a moving object A. Similarly, an absolute navigation unit 8B processes GPS data yielded by a GPS receiver 1B acquired via a communication unit 2A to determine the absolute position, absolute velocity, clock bias and clock drift of a moving object B.

A time tag error correction unit 6 corrects a time tag of the GPS data yielded by the GPS receiver 1A on the basis of Eq. (13A) using a clock bias $b^A$ which is a part of the output of the absolute navigation unit 8A. It also corrects a time tag of the GPS data yielded by the GPS receiver 1B on the basis of Eq. (13B) using a clock bias $b^B$ which is a part of the output of the absolute navigation unit 8B.

According to the sixth preferred embodiment, absolute errors of time tag are corrected in the time tag commonizing unit 4 using the clock biases $b^A$ and $b^B$ in advance in a manner similar to the fifth preferred embodiment. This makes it possible to equivalently establish synchronism in time measurement of a GPS signal even when the GPS receiver is not so accurately in synchronization with time information in the GPS signal.

Although the sixth preferred embodiment is more complicated than the fifth preferred embodiment, the absolute navigation units 8A and 8B can be customized. Customization enables a clock bias to be adjusted on a required level of precision.

The first to sixth preferred embodiments describe examples of methods for correcting errors attributable to time measurement with reference to systems in relative navigation. This is based on the fact that the advantages of the present invention are demonstrated more clearly in relative navigation than in absolute navigation, because time tag errors in relative navigation are smaller than those associated with absolute navigation. It is however obvious that the invention may be applied to GPS systems in absolute navigation.

What is claimed is:

1. A global positioning system (GPS) receiving system having a first GPS receiver mounted on a first moving object and a second GPS receiver mounted on a second moving object, the first and second GPS receivers calculating relative positions and relative velocities of the first and second moving objects by selecting GPS data with a common GPS satellite identification number from first GPS data yielded by the first GPS receiver and second GPS data yielded by the second GPS receiver, at least one of the first moving object and the second moving object comprising:
   a time tag commonizing unit for commonizing time tags of a first pseudorange between a GPS satellite and the first moving object and a second pseudorange between the GPS satellite and the second moving object;
   a differential computation unit for calculating a difference between the first pseudorange and the second pseudorange commonized by the time tag commonizing unit; and
   a time tag error correction unit for correcting the difference with a time tag error attributable to clock inaccuracy of the first GPS receiver and the second GPS receiver.

2. The GPS receiving system according to claim 1, wherein the time tag error correction unit calculates the time tag error from (a) a first range rate, which is a change rate of the first pseudorange, (b) a first clock bias, which is clock inaccuracy of the first GPS receiver, (c) a second range rate, which is a change rate of the second pseudorange, and (d) a second clock bias, which is clock inaccuracy of the second GPS receiver.

3. The A GPS receiving system according to claim 1, comprising:
   a first absolute navigation unit for estimating a first clock bias from an output of the first GPS receiver;
   a first range rate calculation unit for calculating a first range rate from the output of the first GPS receiver;
   a second absolute navigation unit for estimating a second clock bias from an output of the second GPS receiver; and
   a second range rate calculation unit for calculating a second range rate from the output of the second GPS receiver, wherein the time tag error correction unit calculates a time tag error from the first clock bias and the second clock bias respectively estimated by the first absolute navigation unit and the second absolute navigation unit, and the first range rate and the second range rate respectively calculated by the first range rate calculation unit and the second range rate calculation unit.

4. The A GPS receiving system according to claim 1, wherein the time tag error correction unit calculates the time tag error from a relative clock bias, the relative clock bias being a difference between the first clock bias and the second clock bias, and one of the first and second range rates.

5. The A GPS receiving system according to claim 4, comprising a relative navigation unit for receiving an output of the time tag error correction unit and for calculating relative positions and relative velocities of the first and second moving objects, wherein the time tag error correction unit uses the relative clock bias yielded by the relative navigation unit.

6. The A GPS receiving system according to claim 1, wherein the time tag error correction unit calculates the time tag error from the difference and one of the first and second range rates.

7. A global positioning system (GPS) receiving system having a first GPS receiver mounted on a first moving object and a second GPS receiver mounted on a second moving object, the first and second GPS receivers calculating relative positions and relative velocities of the first and second moving objects by selecting GPS data with a common GPS satellite identification number from first GPS data yielded by the first GPS receiver and second GPS data yielded by the second GPS receiver, at least one of the first moving object and the second moving object comprising:
   a time tag error correction unit for correcting a time tag of the GPS data selected for a clock bias, which is clock inaccuracy of the GPS receiver producing the GPS data selected;
   a time tag commonizing unit for commonizing a time tag of the GPS data selected and which has been corrected by the time tag error correction unit; and
   a differential computation unit for calculating a difference between a first pseudorange and a second pseudorange having time tags that have been commonized by the time tag commonizing unit.

8. The GPS receiving system according to claim 7, comprising:

a first absolute navigation unit for estimating a first clock bias, which is the clock bias of the first GPS receiver from an output of the first GPS receiver; and a second absolute navigation unit for estimating a second clock bias, which is the clock bias of the second GPS receiver from an output of the second GPS receiver, wherein the time tag error correction unit uses the first clock bias estimated by the first absolute navigation unit and the second clock bias estimated by the second absolute navigation unit.

9. A global positioning system (GPS) receiving system comprising:

a first GPS receiver obtaining GPS data from a plurality of GPS satellites and communicating with a second GPS receiver;

a common GPS satellite selection unit for selecting GPS data required for determining a relative distance between the first GPS receiver and the second GPS receiver from a plurality of GPS data obtained by the first GPS receiver from the plurality of satellites;

a time tag commonizing unit for commonizing time tags of the first GPS receiver and the second GPS receiver with regard to the GPS data selected;

a differential computation unit for calculating a difference between commonized GPS data of the first GPS receiver and commonized GPS data of the second GPS receiver;

a time tag error correction unit for correcting the difference calculated with an error based on clock inaccuracy between the first GPS receiver and the second GPS receiver; and a relative navigation unit for determining relative positions of the first GPS receiver with respect to the second GPS receiver based on the calculated difference after correction.

10. A global positioning system (GPS) receiving system comprising:

a first GPS receiver obtaining GPS data from a plurality of GPS satellites and communicating with a second GPS receiver;

a common GPS satellite selection unit for selecting GPS data required for determining a relative distance between the first GPS receiver and the second GPS receiver from a plurality of items of GPS data obtained by the first GPS receiver from the plurality of satellites;

a time tag error correction unit for correcting time tags of the GPS data selected using clock inaccuracy between the first GPS receiver and the second GPS receiver;

a time tag commonizing unit for commonizing corrected time tags of the first GPS receiver and the second GPS receiver, after correction, for each item of the GPS data selected;

a differential computation unit for calculating a difference between commonized GPS data of the first GPS receiver and commonized GPS data of the second GPS receiver; and a relative navigation unit for determining relative positions of the first GPS receiver with respect to the second GPS receiver based on the calculated difference.

* * * * *

UNITED STATES PATENT AND TRADEMARK OFFICE
CERTIFICATE OF CORRECTION

PATENT NO.   : 6,480,787 B2
DATED        : November 12, 2002
INVENTOR(S)  : Yoshikawa et al.

It is certified that error appears in the above-identified patent and that said Letters Patent is hereby corrected as shown below:

Column 12,
Lines 7, 28, 33 and 40, after "The" delete "A".

Signed and Sealed this

Eighth Day of April, 2003

JAMES E. ROGAN
*Director of the United States Patent and Trademark Office*